US009565494B2

United States Patent
Muramatsu

(10) Patent No.: US 9,565,494 B2
(45) Date of Patent: Feb. 7, 2017

(54) ACOUSTIC PROCESSING DEVICE

(71) Applicant: Yamaha Corporation, Hamamatsu-shi, Shizuoka (JP)

(72) Inventor: Hideaki Muramatsu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 15 days.

(21) Appl. No.: 14/427,378

(22) PCT Filed: Dec. 12, 2013

(86) PCT No.: PCT/JP2013/083401
§ 371 (c)(1),
(2) Date: Mar. 11, 2015

(87) PCT Pub. No.: WO2014/097971
PCT Pub. Date: Jun. 26, 2014

(65) Prior Publication Data
US 2015/0237441 A1     Aug. 20, 2015

(30) Foreign Application Priority Data

Dec. 19, 2012   (JP) ................................. 2012-276959

(51) Int. Cl.
*H04R 3/00*     (2006.01)
(52) U.S. Cl.
CPC ............. *H04R 3/00* (2013.01); *H04R 2430/00* (2013.01)
(58) Field of Classification Search
None
See application file for complete search history.

(56) References Cited

U.S. PATENT DOCUMENTS 8,433,085 B2    4/2013  Mizuno et al.
2006/0259170 A1  11/2006  Sasaki et al.
(Continued)

FOREIGN PATENT DOCUMENTS

JP          6-68189 U      9/1994
JP       2006-311288 A    11/2006
(Continued)

OTHER PUBLICATIONS

Bergman, Eric "Outlaw Audio Model 1070 A/V Surround Sound Receiver Review." May 4, 2006. pp. 1-9. http://www.bigpicturebigsound.com/outlaw-1070-receiver.shtml.*
(Continued)

*Primary Examiner* — Curtis Kuntz
*Assistant Examiner* — Qin Zhu
(74) *Attorney, Agent, or Firm* — Crowell & Moring LLP

(57) ABSTRACT

The present invention provides an acoustic processing device capable of providing a high-quality sound even in a standby through mode. A controller is characterized by supplying power from an auxiliary power supply to a sound signal processing unit in the standby through mode. In the standby through mode, the controller extracts a sound signal included in an input HDMI signal, outputs a high-frequency sound component from an input/output unit to, for example, a television, and outputs a low-frequency sound component from a sound output terminal to a speaker (for example, a subwoofer) with an amplification function. As a result, the user can listen to content with powerful bass on the television, without operating an amplifying circuit, which consumes most of the power consumed by the acoustic processing device, using a main power supply, that is, while suppressing the power consumption of the acoustic processing device.

8 Claims, 7 Drawing Sheets

(56) References Cited

U.S. PATENT DOCUMENTS

| | | | |
|---|---|---|---|
| 2007/0077020 A1 | 4/2007 | Takahama | |
| 2009/0262256 A1* | 10/2009 | Asayama | H04N 5/60 348/738 |
| 2010/0034403 A1 | 2/2010 | Mizuno et al. | |
| 2010/0131782 A1* | 5/2010 | Higuchi | H04N 5/77 713/310 |
| 2011/0234916 A1 | 9/2011 | Fujita et al. | |
| 2012/0283860 A1* | 11/2012 | Ho | G06F 1/3209 700/94 |

FOREIGN PATENT DOCUMENTS

| | | |
|---|---|---|
| JP | 2007-88774 A | 4/2007 |
| JP | 2009-43177 A | 2/2009 |
| JP | 2011-77843 A | 4/2011 |
| JP | 2011-166681 A | 8/2011 |
| JP | 2011-199693 A | 10/2011 |

OTHER PUBLICATIONS

Yamaha, "AV Receiver RX-V573 Owner's Manual." Mar. 27, 2012. pp. 1-133. http://download.yamaha.com/search/product/?language=en&site=usa.yamaha.com&category_id=16446&product_id=1643056.*

International Search Report (PCT/ISA/210) dated Mar. 25, 2014, with English translation (four (4) pages).

Japanese-language Written Opinion (PCT/ISA/237) dated Mar. 25, 2014 (four (4) pages).

Chinese Office Action issued in counterpart Chinese Application No. 201380046814.2 dated Nov. 13, 2015, with English translation (nine (9) pages).

Extended European Search Report issued in counterpart European Application No. 13865435.5 dated May 12, 2016 (Eleven (11) pages).

* cited by examiner

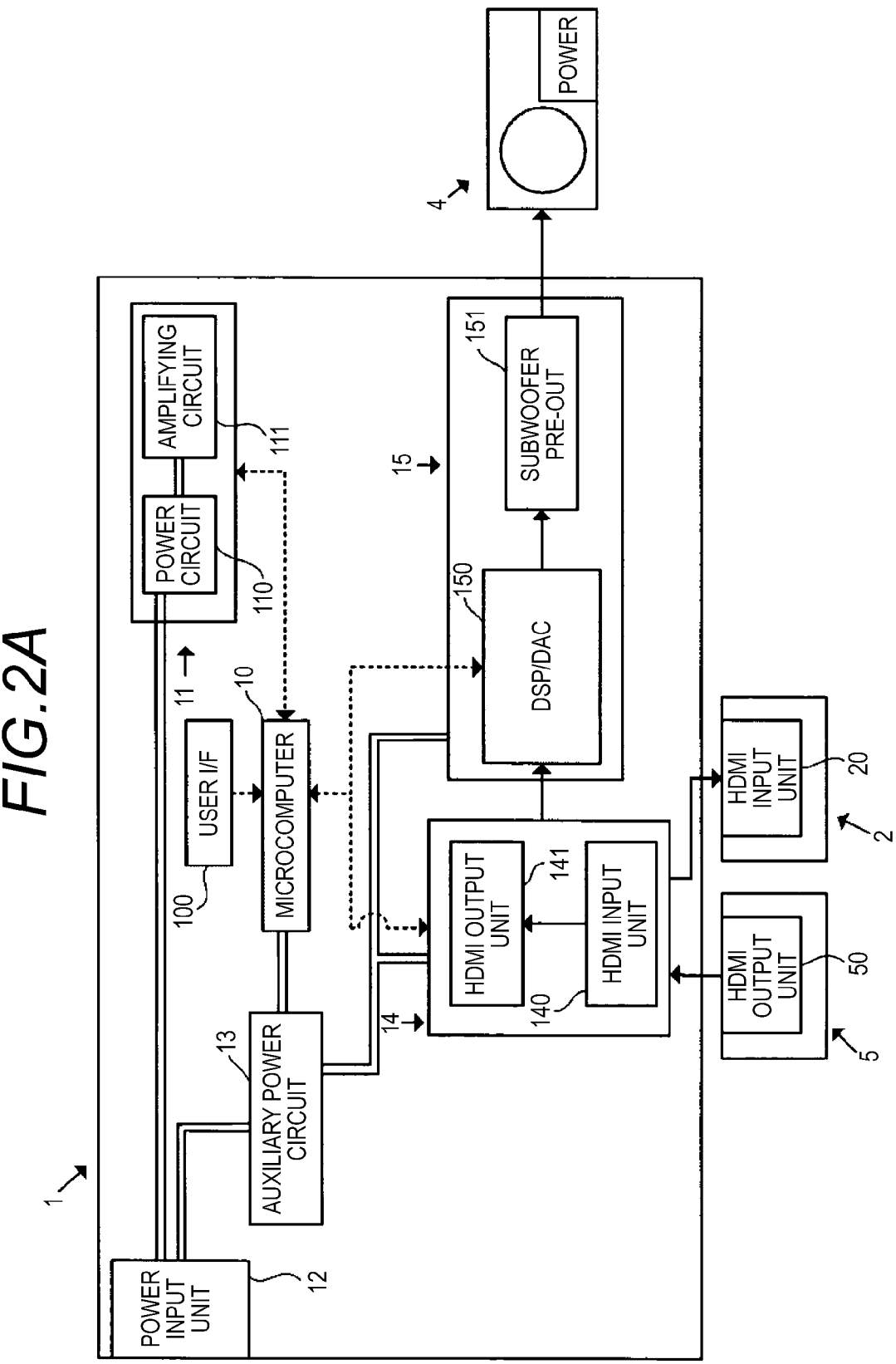

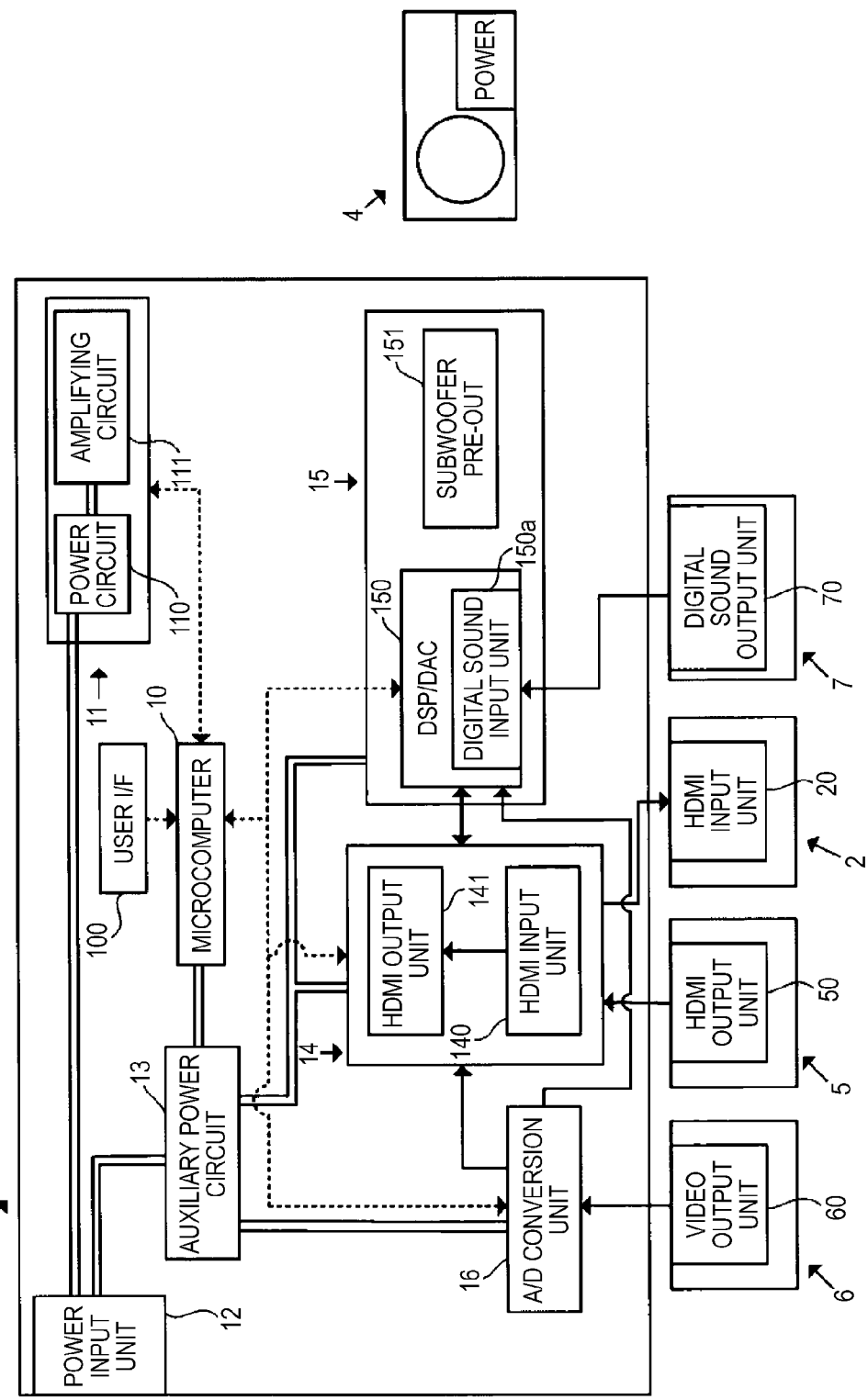

ACOUSTIC PROCESSING DEVICE

TECHNICAL FIELD

The present invention relates to an acoustic processing device having a function of relaying a content signal.

BACKGROUND ART

An amplifier device has been known which receives a content signal from a content reproduction apparatus (for example, a Blu-ray disc (registered trademark) player) and amplifies a sound signal included in the content signal such that a sound is output from a speaker set.

The amplifier device outputs a video signal included in the input content signal to an external equipment (for example, a television) such that the television reproduces the video signal.

The amplifier device requires a large amount of power consumption (for example, tens to hundreds of watts) in order to amplify the sound signal. The amplifier device has a standby through mode in order to enable only the television to reproduce the video and sound signals, without amplifying the sound signal (see Patent Literature 1).

CITATION LIST

Patent Literature

Patent Literature 1: JP-A-2011-166681

SUMMARY OF INVENTION

Technical Problem

In the standby through mode, the sound signal included in the content signal which is input to the amplifier device is relayed to the television and is then reproduced by the television. However, in many cases, a speaker provided in the television has low bass reproduction capability.

When the standby through mode is cancelled and the amplifier device uses the amplification function, a large amount of power is consumed.

An object of the present invention is to provide an acoustic processing device which can provide a high-quality sound even in a standby through mode.

Solution to Problem

An acoustic processing device according to a first aspect of the present invention includes: a controller; a signal input/output unit that receives and outputs a signal from/to a first external equipment; a sound signal processing unit that performs predetermined processing on a sound signal and outputs the sound signal; a sound output terminal from which a sound is output to a second external equipment; a main power supply; and an auxiliary power supply, and the controller performs a standby through mode which supplies power from the auxiliary power supply to the signal input/output unit, without supplying power to the main power supply, in order to output an input signal to the first external equipment or the second external equipment.

The controller supplies power from the auxiliary power supply to the sound signal processing unit as well in the standby through mode, and the sound signal processing unit in the standby through mode extracts the sound signal from the signal which is input to the signal input/output unit, extracts a high-frequency sound component and a low-frequency sound component from the sound signal, outputs the high-frequency sound component to the signal input/output unit, and outputs the low-frequency sound component from the sound output terminal.

In the standby through mode, the controller relays a video signal among the signals input to the signal input/output unit, for example, high definition multimedia interface (HDMI: registered trademark) signals compliant to an HDMI standard to an external device (for example, a television), without causing the main power supply to supply power to, for example, an amplifying circuit which amplifies the level of an analog sound signal.

In the standby through mode, the controller extracts a sound signal included in an input HDMI signal, outputs a high-frequency sound component from the input/output unit to, for example, the television, and outputs a low-frequency sound component from the sound output terminal to a built-in speaker (for example, a subwoofer) with an amplification function. As a result, the user can listen to content with powerful bass on the television, without operating an amplifying circuit, which consumes most of the power consumed by the acoustic processing device (amplifier device), using the main power supply, that is, while suppressing the power consumption of the acoustic processing device. The apparatus which receives the sound signal from the sound output terminal is not limited to the subwoofer. Any apparatus may be used as long as it can amplify the sound signal and output a sound.

The acoustic processing device may be configured so that the sound signal processing unit includes an acoustic processing section for performing acoustic processing on the sound signal, and the controller supplies power from the auxiliary power supply also to the acoustic processing section in the standby through mode.

Even in the standby through mode, the acoustic processing section performs audio processing on the sound signal in order to give an audio effect (for example, sound field processing, such as frequency correction, a process of delaying a sound signal in order to correct the reproduction asynchronism between the television and the subwoofer, dynamic range processing for correcting the sound signal to fall within a predetermined volume level range, or a process of generating a virtual audio source). The sound signal subjected to the audio processing is output from the signal input/output unit and the sound output terminal. As a result, the user can reproduce the sound to which various audio effects are given, with the speaker of the television or the subwoofer, while suppressing the power consumption of the acoustic processing device.

The acoustic processing device may further include an analog-digital conversion unit that converts an input analog signal into a digital signal, and may be configured so that the controller supplies power from the auxiliary power supply to the analog-digital conversion unit as well in the standby through mode, and the analog-digital conversion unit outputs the converted digital signal to the sound signal processing unit or the signal input/output unit in the standby through mode.

The analog-digital conversion unit converts, for example, an analog video signal into an HDMI signal even in the standby through mode. A high-frequency sound component of a sound signal included in the converted HDMI signal is output to the television. At the same time, a low-frequency sound component of the sound signal is output to the subwoofer. Therefore, the user can listen to analog video content, while suppressing the power consumption of the acoustic processing device.

An acoustic processing device according to another embodiment of the present invention is configured so that the controller supplies power from the auxiliary power supply to the sound signal processing unit as well in the standby through mode, the signal input/output unit receives the sound signal from the first external equipment in the standby through mode, and the sound signal processing unit in the standby through mode extracts a low-frequency sound component from the sound signal which is input to the signal input/output unit and outputs the low-frequency sound component from the sound output terminal.

For example, even when the HDMI signal is not output to the television, the signal input/output unit receives the sound signal through an audio return channel (ARC) of an HDMI cable used for connection to the television. For example, the subwoofer amplifies a low-frequency sound component of a television broadcast sound signal and outputs a sound. As a result, the user can listen to television broadcast content with powerful bass even in the standby through mode.

The acoustic processing device may be configured so that the sound signal processing unit includes a low-pass filter with a predetermined cutoff frequency and extracts the low-frequency sound component from the sound signal with the cutoff frequency of the low-pass filter.

Even when there is no low-frequency sound component channel in the input sound signal, the acoustic processing device can extract and generate a low-frequency sound component from the sound signal of another channel using the low-pass filter.

Advantageous Effects of Invention

According to the acoustic processing device of the present invention, it is possible to obtain a high-quality sound even in the standby through mode.

BRIEF DESCRIPTION OF DRAWINGS

FIGS. 2A and 2B are diagrams illustrating signal lines in a standby through mode of the AV amplifier 1.

FIG. 4 is a diagram illustrating signal lines in a standby through mode of the AV amplifier 1A.

DESCRIPTION OF EMBODIMENTS

Figure 1A:
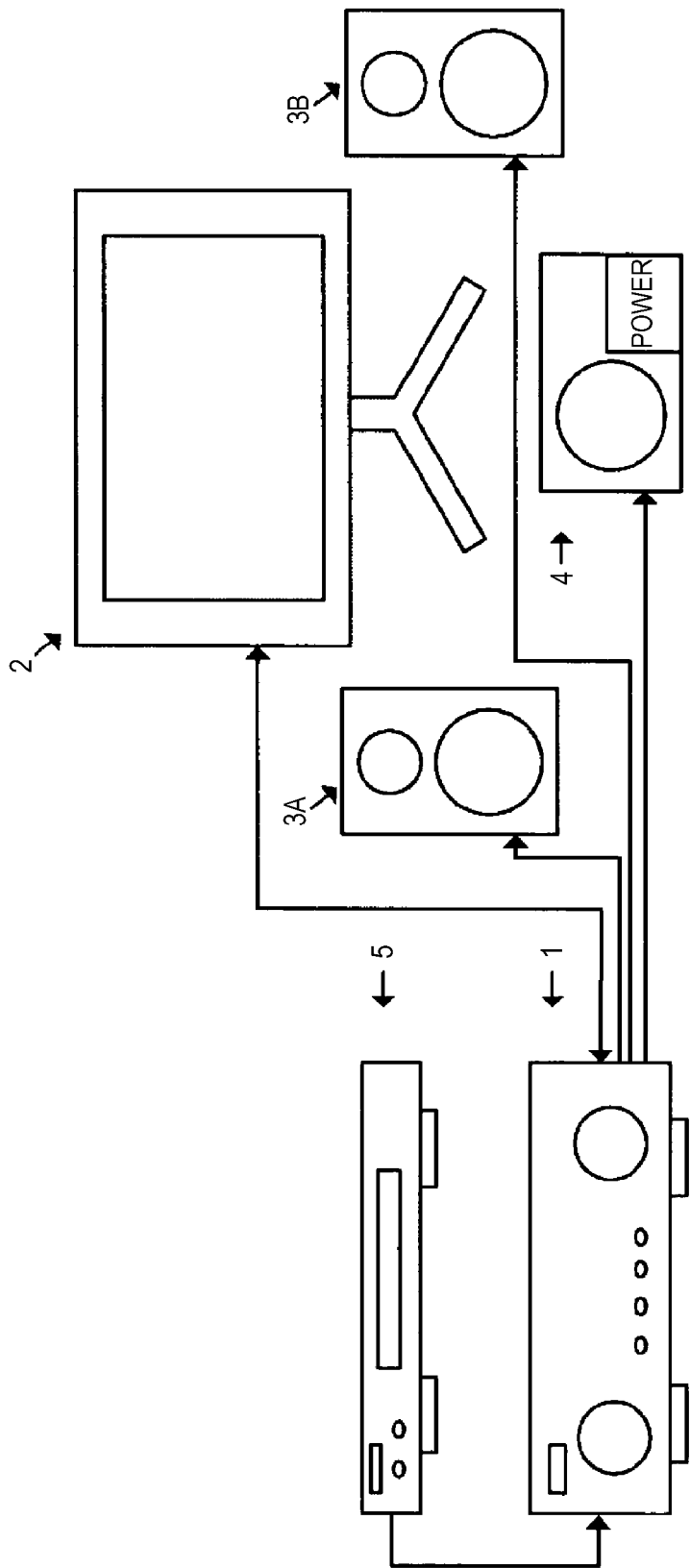
FIG. 1A shows an indoor installation environment of an AV amplifier 1 and FIG. 1B is a block diagram of the AV amplifier 1.

FIG. 1A is a diagram illustrating an indoor installation environment of an AV amplifier 1 (acoustic processing device) according to an embodiment. As shown in FIG. 1A, the AV amplifier 1 is connected to a television 2, two speakers 3A and 3B, a subwoofer 4, and a Blu-ray disc (BD) player 5. The AV amplifier 1 is connected to the television 2 and the BD player 5 by HDMI cables. The AV amplifier 1 is connected to the speakers 3A and 3B by speaker cables. The AV amplifier 1 is connected to the subwoofer 4 by a line cable.

The AV amplifier 1 processes an AV content signal (corresponding to a signal according to the present invention) transmitted from the BD player 5 such that a video signal is reproduced by the television 2 or a sound signal is reproduced by the speakers 3A and 3B and the subwoofer 4, or the AV amplifier 1 relays a signal from a content reproduction apparatus. In practice, in some cases, the AV amplifier 1 is connected to, for example, a rear speaker, in addition to the speakers 3A and 3B. However, this configuration will not be described in this embodiment. Furthermore, in some cases, the AV amplifier 1 receives a content signal from a content reproduction apparatus other than the BD player 5. This configuration will not be described in this embodiment. The video output destination of the AV amplifier 1 is not limited to the television 2.

Figure 1B:
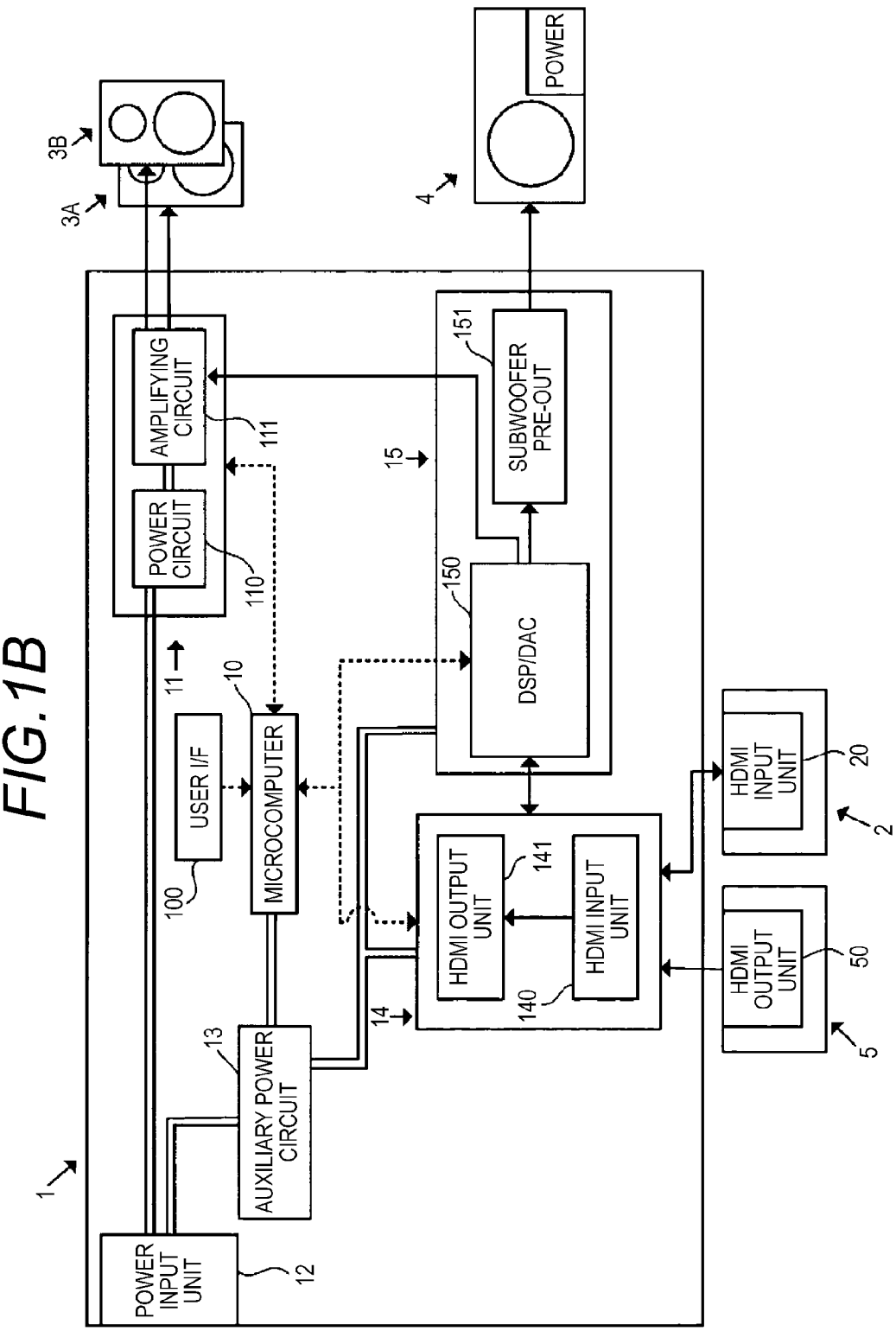

FIG. 1B is a block diagram illustrating the AV amplifier 1 and other apparatuses.

The AV amplifier 1 includes a microcomputer 10 (corresponding to a controller according to the present invention), a user I/F 100, an amplifier unit 11, a power input unit 12, an auxiliary power circuit 13 (corresponding to an auxiliary power supply according to the present invention), an HDMI processing unit 14 (corresponding to a signal input/output unit according to the present invention), and a sound signal processing unit 15. The amplifier unit 11 includes a power circuit 110 (corresponding to a main power supply according to the present invention) and an amplifying circuit 111. The HDMI processing unit 14 includes an HDMI input unit 140 and an HDMI output unit 141. The sound signal processing unit 15 includes a digital signal processor (DSP)/digital audio converter (DAC) 150 (corresponding to a sound signal processing unit according to the present invention) and a subwoofer pre-out 151 (corresponding to a sound output terminal).

In FIG. 1B, a dashed line indicates a control path from the microcomputer 10, a solid line indicates the path of the content signals (including HDMI signals and sound signals), and a double line indicates a power supply path.

As shown in FIG. 1B, the microcomputer 10 controls the overall operation of each functional unit. The user I/F 100 transmits, to the microcomputer 10, an operation instruction which is received from the user through a remote controller or an operation button provided on the front surface of the AV amplifier 1. When receiving AC power from the power input unit 12, the auxiliary power circuit 13 converts the AC power into DC power. As shown in FIG. 1B, the converted DC power is supplied to the HDMI processing unit 14 and the sound signal processing unit 15. When power is supplied from the power input unit 12, the power circuit 110 supplies the DC power to the amplifying circuit 111. The amplifying circuit 111 amplifies an input sound signal and outputs the amplified sound signal to each speaker 3.

As shown in FIG. 1B, the HDMI input unit 140 receives an HDMI signal, which is a signal compliant to an HDMI, from an HDMI output unit 50 of the BD player 5. In addition, the HDMI input unit 140 outputs the input HDMI signal to the HDMI output unit 141 or outputs a sound signal included in the HDMI signal to the DSP/DAC 150.

The subwoofer pre-out 151 is an output interface which outputs the input sound signal to the subwoofer 4, without amplifying the input sound signal.

The HDMI output unit 141 transmits a video signal included in the HDMI signal output from the HDMI input unit 140 or the sound signal output from the DSP/DAC 150 as the HDMI signal to an HDMI input unit 20 of the television 2. In addition, the HDMI processing unit 14 (HDMI output unit 141) can receive a sound signal from the HDMI input unit 20 of the television 2.

The DSP/DAC 150 is a functional unit which performs predetermined signal processing on the input sound signal.

The DSP/DAC 150 performs a filtering process on the sound signal based on, for example, a cutoff frequency received by the user I/F 100. The sound signal is divided into a sound signal including low-frequency components and a sound signal including components other than the low-frequency components by the filtering process of the DSP/DAC 150. However, the cutoff frequency is not limited to a user input, but may be stored in the microcomputer 10 or the DSP/DAC 150 in advance.

The DSP/DAC 150 converts a digital sound signal into an analog sound signal and outputs the analog sound signal to the amplifier unit 11 or the subwoofer pre-out 151.

Before a standby through mode of the AV amplifier 1 according to the present invention is described, a normal operation mode of the AV amplifier 1 will be described using an example in which the content of a BD is reproduced. When a switch provided on the front surface of a housing of the AV amplifier 1 is pressed (is turned on), the AV amplifier 1 changes to the normal operation mode. When the AV amplifier 1 changes to the normal operation mode, the power circuit 110 receives power from the power input unit 12. In the BD player 5, an HDMI signal of the content recorded on the BD is output from the HDMI output unit 50. The HDMI signal output from the HDMI output unit 50 is input to the HDMI input unit 140. When the HDMI signal is input to the HDMI input unit 140, the microcomputer 10 controls the HDMI input unit 140 such that a video signal included in the HDMI signal is output to the HDMI output unit 141 and a sound signal included in the HDMI signal is output to the DSP/DAC 150.

The sound signal input to the DSP/DAC 150 is divided into a sound signal including low-frequency components and a sound signal including components other than the low-frequency components by the filtering process.

The sound signal including the low-frequency components is converted into an analog sound signal by the DSP/DAC 150 and is then output to the subwoofer pre-out 151. The signal output from the subwoofer pre-out 151 is amplified by a built-in power amplifier of the subwoofer 4 and is then output as a sound.

The sound signal including components other than the low-frequency components is converted into an analog sound signal by the DSP/DAC 150 and is then output to the amplifier unit 11. The sound signal input to the amplifier unit 11 is amplified by the amplifying circuit 111. Then, the amplified sound signal is output to the speakers 3A and 3B and is then output as a sound.

The HDMI signal (only the video signal) input to the HDMI output unit 141 is output to the HDMI input unit 20 of the television 2. The HDMI signal input to the HDMI input unit 20 is displayed and reproduced by the television 2.

The sound signal output from the DSP/DAC 150 may be output to the speakers 3A and 3B and the subwoofer 4, or may be also output as the HDMI signal to the television 2.

In the standby through mode according to the related art, in the amplifier device, a main power supply (power circuit 110) for an amplifying circuit is turned off and a sub-power supply (auxiliary power circuit 13) for signal transmission is turned on. In the standby through mode of the amplifier device according to the related art, an input HDMI signal is transmitted to the television 2, without passing through a DSP, and is reproduced only by a built-in speaker of the television 2.

In the standby through mode, the AV amplifier 1 according to the present invention extends the supply range of the sub-power supply (auxiliary power circuit 13) and causes another apparatus (subwoofer 4) to output a sound, with the main power supply (power circuit 110) turned off. Therefore, sound quality is higher than that when the HDMI signal is reproduced only by the built-in speaker of the television 2. Next, the operation of the AV amplifier 1 in the standby through mode will be described using an example in which the content of the BD is reproduced. FIG. 2A is a block diagram illustrating the signal lines of the AV amplifier 1 in the standby through mode.

When the switch provided on the front surface of the housing of the AV amplifier 1 is turned off, the AV amplifier 1 switches to the standby through mode. When the AV amplifier 1 switches to the standby through mode, the power circuit 110 turns off a power-input-side relay (not shown) provided therein in response to a command from the microcomputer 10 and does not receive power. The HDMI processing unit 14 and the sound signal processing unit 15 receive the DC power from the auxiliary power circuit 13 in the standby through mode. However, a trigger for switching the operation mode to the standby through mode is not limited to the switch. The microcomputer 10 may stop the supply of power to the power circuit 110 based on an operation instruction received by the user I/F 100. In addition, the supply of power may be stopped by a HDMI consumer electronics control (CEC) command from the television 2.

The HDMI signal output from the HDMI output unit 50 is input to the HDMI processing unit 14 (HDMI input unit 140). When the HDMI signal is input to the HDMI input unit 140, the microcomputer 10 controls the HDMI input unit 140 such that a video signal included in the HDMI signal is output to the HDMI output unit 141 and a sound signal included in the HDMI signal is output to the DSP/DAC 150, similarly to the normal operation mode.

The sound signal input to the DSP/DAC 150 is divided into a sound signal including low-frequency components and a sound signal including components other than the low-frequency components by the filtering process.

The sound signal including the low-frequency components is converted into an analog sound signal by the DSP/DAC 150 and is then output from the DSP/DAC 150 to the subwoofer pre-out 151. The signal output from the subwoofer pre-out 151 is amplified by the built-in power amplifier of the subwoofer 4 and is then output as a sound.

The sound signal including components other than the low-frequency components is output from the DSP/DAC 150 to the HDMI output unit 141. The sound signal which is output from the DSP/DAC 150 to the HDMI output unit 141 and the HDMI signal including the video signal are input to the HDMI input unit 20 of the television 2. Then, the television 2 reproduces the video and sound signals based on the HDMI signal input to the HDMI input unit 20.

As described above, the AV amplifier 1 enables the television 2 and the subwoofer 4 to reproduce the content of the BD, without operating the amplifier unit 11 requiring a large amount of power consumption. As a result, the AV amplifier 1 can provide powerful bass which is not output by the built-in speaker of the television 2. Therefore, the user can listen to the content of the BD with a powerful high-quality sound, while suppressing the power consumption of the AV amplifier 1.

In the standby through mode, the DSP/DAC 150 may perform signal processing on the input sound signal in order to give an audio effect to the sound signal. The DSP/DAC 150 performs sound field processing, such as frequency correction (equalization), a process of delaying a sound signal in order to correct the asynchronism between the reproduction of the video signal by the television 2 and the reproduction of the sound signal by the subwoofer 4 (or the built-in speaker of the television 2), dynamic range processing for correcting the sound signal to fall within a predetermined volume level range, and a process of generating a virtual audio source. The content of the signal processing is set based on settings from the user through the user I/F 100 of the AV amplifier 1. Therefore, the user can listen to the content of the BD with a powerful high-quality sound, while suppressing the power consumption of the AV amplifier 1.

The DSP/DAC 150 changes a cutoff frequency for extracting the low-frequency component according to the operation mode. For example, the AV amplifier 1 stores the cutoff frequency for each operation mode. In the normal operation mode, the AV amplifier 1 uses the cutoff frequency corresponding to the reproduction frequency band of the speakers 3A and 3B. When the operation mode switches to the standby through mode, the AV amplifier 1 changes the cutoff frequency. For example, the AV amplifier 1 can increase the cutoff frequency so as to assist the built-in speaker of the television 2 which has a low output at a low frequency and can cause the subwoofer 4 to output a sound.

However, the process of the DSP/DAC 150 giving the audio effect is not indispensable in the present invention. When the process of giving the audio effect is not performed, the microcomputer 10 supplies power from the auxiliary power circuit 13 to the DSP/DAC 150 such that only the filtering process of extracting the low-frequency components and components other than the low-frequency components is performed.

In the above-mentioned example, the subwoofer 4 is used. However, any active speaker can be used as the subwoofer 4 as long as it can amplify the sound signal.

The AV amplifier 1 may receive multi-channel sound signals. In this case, the DSP/DAC 150 down-mixes multi-channel sound signals other than sound signals of a low-frequency effect (LFE) channel and generates a 2-channel signal. The DSP/DAC 150 performs a filtering process on the down-mixed signal to extract the low-frequency components, adds the processed signal to an LFE-channel sound signal, and outputs the sound signal to the subwoofer pre-out 151. The components other than the low-frequency components extracted by the filtering process of the DSP/DAC 150 are output from the HDMI output unit 141 to the TV.

Figure 2B:
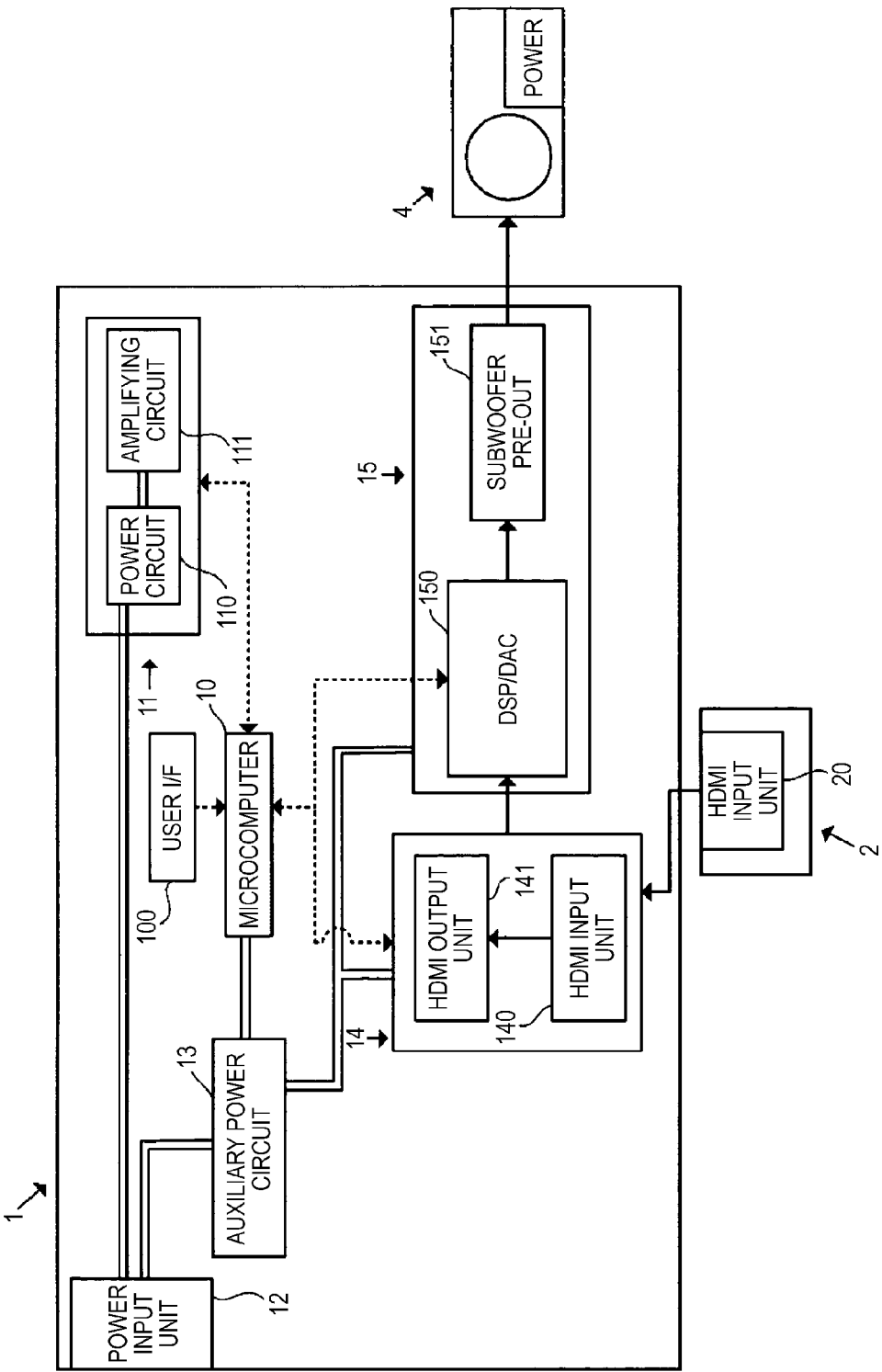

Next, an example in which the AV amplifier 1 reproduces a television broadcast sound signal in the standby through mode will be described. FIG. 2B is a block diagram illustrating the flow of the television broadcast sound signal in the standby through mode of the AV amplifier 1.

The HDMI standard has an audio return channel (ARC) function of outputting a sound signal from an HDMI input interface to an HDMI output interface.

The sound signal output from the HDMI input unit 20 of the television 2 is input to the HDMI processing unit 14 (HDMI output unit 141) through the HDMI cable by the ARC function. The sound signal is output to the DSP/DAC 150. Then, the sound signal is filtered into a signal including a low-frequency component by the DSP/DAC 150. Then, the filtered signal is converted into an analog sound signal by the DSP/DAC 150. The analog sound signal is output from the DSP/DAC 150 to the subwoofer 4 through the subwoofer pre-out 151.

As described above, the AV amplifier 1 causes the subwoofer 4 to output a sound based on the sound signal of the television 2. Therefore, the user can listen to the content of a television program with a powerful high-quality sound, while suppressing the power consumption of the AV amplifier 1.

The DSP/DAC 150 may give an audio effect to the sound signal to be output to the subwoofer pre-out 151. Means for receiving the sound signal from the television 2 is not limited to the ARC function of the HDMI standard. For example, an optical cable may be used to receive the sound signal.

The cutoff frequency of a low-pass filter in the DSP/DAC 150 may be calculated based on the reproduction frequency characteristics of the built-in speaker of the television 2 acquired by an HDMI CEC command. In this case, first, the microcomputer 10 inquires of the television 2 about the reproduction frequency band of the built-in speaker, using an HDMI CEC command. Then, the television 2 returns the reproduction frequency band of the built-in speaker to the AV amplifier 1 using an HDMI CEC command. Then, the microcomputer 10 calculates a cutoff frequency such that the subwoofer 4 reproduces a sound signal in a frequency band lower than the acquired reproduction frequency band of the built-in speaker of the television 2. As a result, bass output from the subwoofer 4 does not overlap bass which is output from the built-in speaker of the television 2.

Figure 3A:
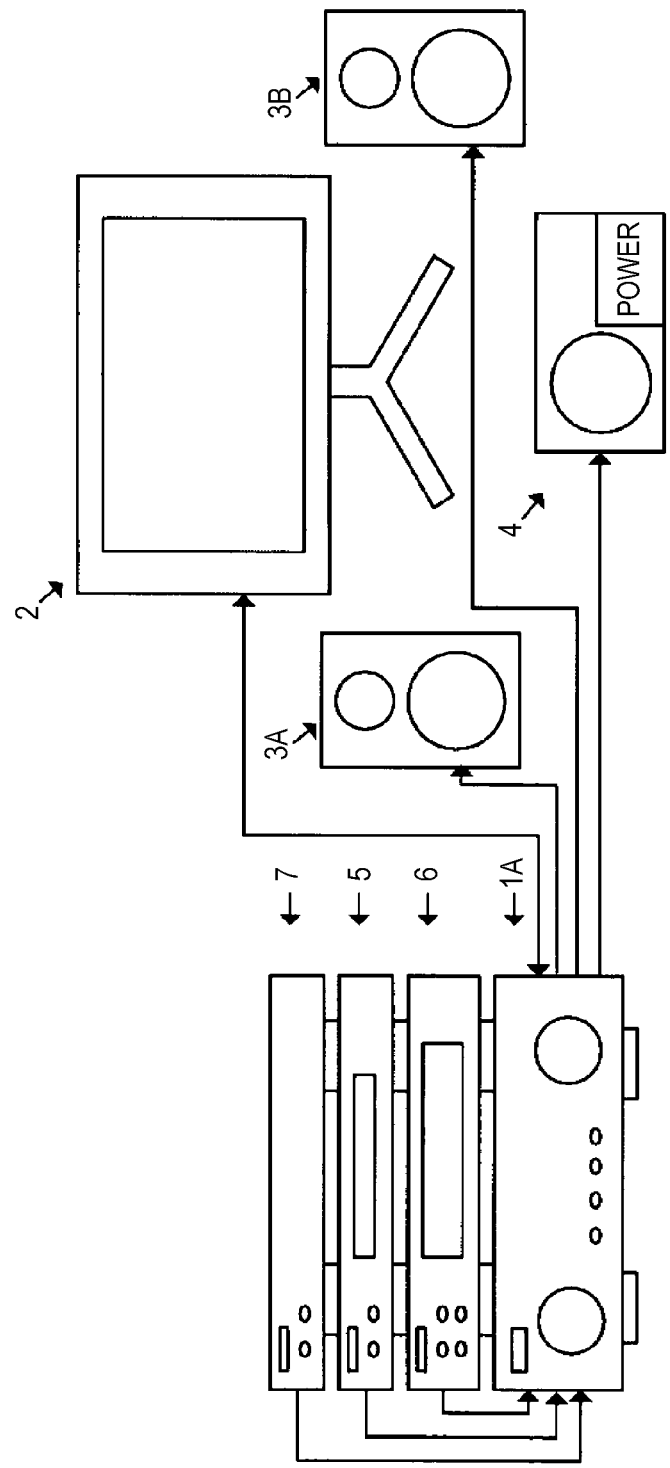
FIG. 3A shows a usage environment of an AV amplifier 1A according to a modification example and FIG. 3B is a block diagram of the AV amplifier 1A.
Figure 3B:
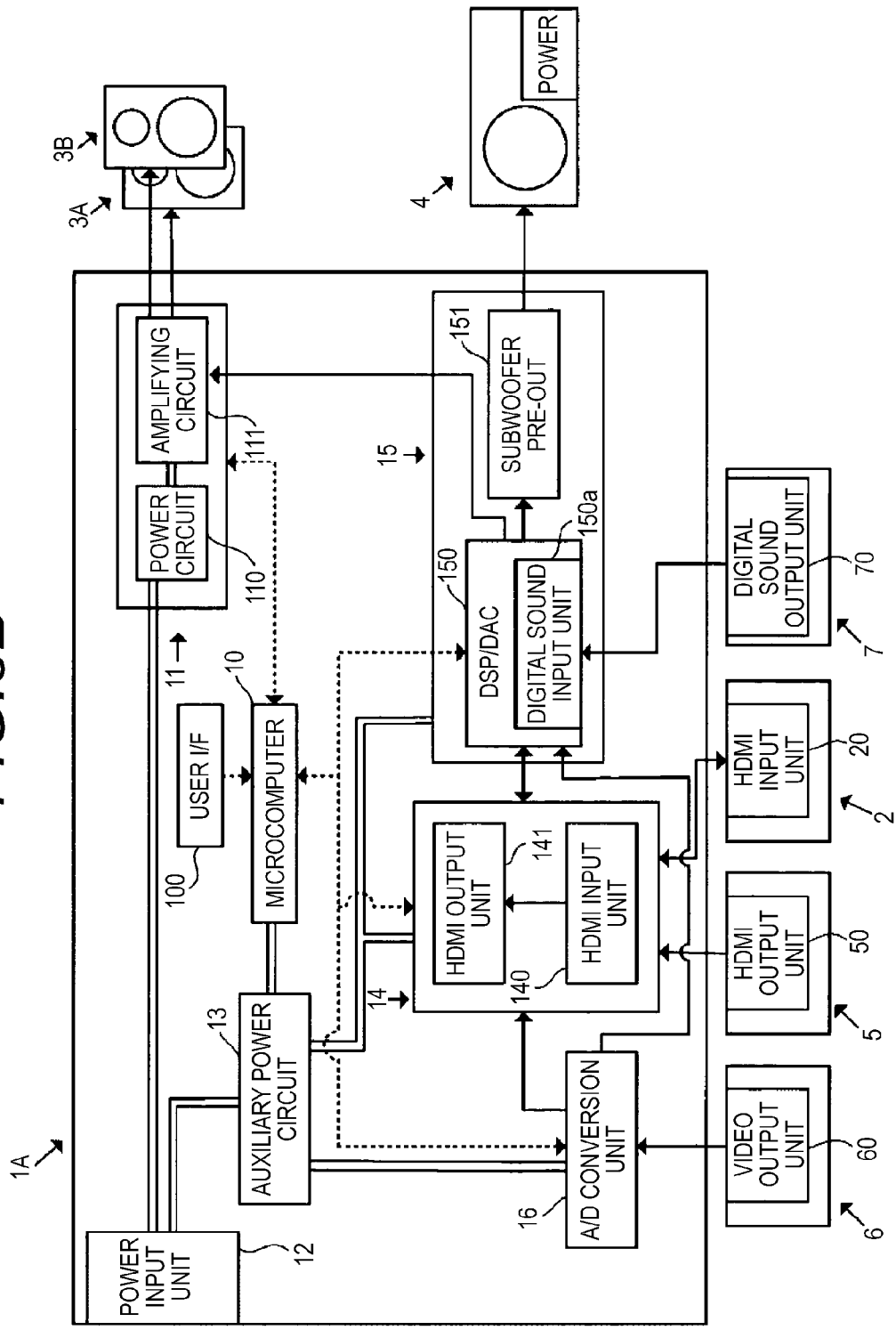

FIG. 3A is a diagram illustrating the indoor installation environment of an AV amplifier 1A according to a modification example and FIG. 3B is a block diagram illustrating the AV amplifier 1A. The description of the same components as those in the AV amplifier 1 shown in FIG. 1B will not be repeated.

As shown in FIG. 3A, the AV amplifier 1A is connected to a video player 6 and an audio player 7. The video player 6 reproduces video and sound signals stored in a magnetic tape. The audio player 7 reproduces music data. The AV amplifier 1A is connected to the video player 6 by an S video cable and two stereo audio cables. The AV amplifier 1A is connected to the audio player 7 by an optical digital cable.

FIG. 3B is a block diagram illustrating the AV amplifier 1A and other apparatuses.

The block diagram of the AV amplifier 1A differs from the block diagram of the AV amplifier 1 shown in FIG. 1B in that an A/D conversion unit 16 which performs A/D conversion is provided and an optical signal output from a digital sound output unit 70 of the audio player 7 is input to a digital sound input unit 150a of a DSP/DAC 150.

As shown in FIG. 3B, the A/D conversion unit 16 and the digital sound input unit 150a are supplied with DC power from an auxiliary power circuit 13 in the standby through mode.

The A/D conversion unit 16 converts an input analog sound signal into a digital signal. In addition, the A/D conversion unit 16 converts (up-converts) an input analog video signal into an HDMI signal so as to be suitable for the HDMI standard. The digital sound input unit 150a of the DSP/DAC 150 converts an input optical signal into a sound signal.

A video signal output unit 60 of the video player 6 outputs an analog video signal and an analog sound signal. The digital sound output unit 70 of the audio player 7 converts a sound signal of the music data reproduced by the audio player 7 into an optical signal and outputs the optical signal.

First, the standby through mode of the AV amplifier 1A will be described using an example in which the content of the video player 6 is reproduced.

The analog video signal which is output from the video signal output unit 60 of the video player 6 is converted into an HDMI signal. The analog sound signal which is output from the video signal output unit 60 of the video player 6 is converted into a digital sound signal.

The converted HDMI signal is output from the A/D conversion unit 16 to the HDMI processing unit 14. Then, the HDMI signal input to the HDMI processing unit 14 is output to an HDMI input unit 20 of the television 2.

The digital sound signal converted by the A/D conversion unit 16 is output to the DSP/DAC 150. The digital sound signal is output to the built-in speaker of the television 2 and the subwoofer 4, similarly to the example in which the content of the BD is reproduced in the standby through mode of the AV amplifier 1.

As described above, in the standby through mode, the AV amplifier 1A converts the analog signal from the video player 6 into the HDMI signal such that the television 2 displays and reproduces the HDMI signal and the subwoofer 4 reproduces the low-frequency components of the sound signal as a sound.

The A/D conversion unit 16 may select any one of the analog signals output from a plurality of content reproduction apparatuses, based on a user selection operation received by the user I/F 100, and convert the selected signal into an HDMI signal/digital sound signal. In this case, the user can switch the signal to the signal of the content reproduction apparatus that the user wants to listen to, while suppressing the power consumption of the AV amplifier 1A.

The connected apparatus is not limited to the video player 6. For example, the connected apparatus may be a DVD player. In addition, a connection cable is not limited to the S video cable. For example, the apparatus may be connected by a composite cable.

Next, an example of the reproduction of music data by the audio player 7 in the standby through mode of the AV amplifier 1A will be described.

The optical signal which is output from the digital sound output unit 70 of the audio player 7 is input to the digital sound input unit 150a of the DSP/DAC 150. The optical signal input to the digital sound input unit 150a is converted into a sound signal by the digital sound input unit 150a.

The sound signal input to the DSP/DAC 150 is output to the built-in speaker of the television 2 and the subwoofer 4, similarly to the example of the reproduction of the content of the BD in the standby through mode of the AV amplifier 1.

As described above, even when the AV amplifier 1A is connected to an apparatus which reproduces only sound signals, it can provide a powerful high-quality sound, while reducing power consumption.

Means for connecting the audio player 7 is not limited to the optical digital cable. For example, the audio player 7 may be connected by a coaxial cable.

As shown in FIG. 4, the AV amplifier 1A does not output the sound signal to the subwoofer pre-out 151 and may output only the sound signal to be output from the built-in speaker of the television 2. In this case, the DSP/DAC 150 outputs the sound signal to the HDMI processing unit 14, without performing the filtering process. In this case, the user can listen to the content of the video player 6 and the audio player 7 on the television 2 with a sound to which the audio effect is given by the DSP/DAC 150, while reducing the power consumption of the AV amplifier 1A.

This application is based on Japanese Patent Application No. 2012-276959 filed on Dec. 19, 2012, the contents of which are incorporated herein by reference.

REFERENCE SIGNS LIST

1: AV AMPLIFIER
2: TELEVISION
3A, 3B: SPEAKER
4: SUBWOOFER
5: BD PLAYER
6: VIDEO PLAYER
7: AUDIO PLAYER
10: MICROCOMPUTER
11: AMPLIFIER UNIT
12: POWER INPUT UNIT
13: AUXILIARY POWER CIRCUIT
14: HDMI PROCESSING UNIT
15: SOUND SIGNAL PROCESSING UNIT
16: A/D CONVERSION UNIT
20: HDMI INPUT UNIT
50: HDMI OUTPUT UNIT
60: VIDEO SIGNAL OUTPUT UNIT
70: DIGITAL SOUND OUTPUT UNIT
110: POWER CIRCUIT
111: AMPLIFYING CIRCUIT
140: HDMI INPUT UNIT
141: HDMI OUTPUT UNIT
150: DSP/DAC
150a: DIGITAL SOUND INPUT UNIT
151: SUBWOOFER PRE-OUT

The invention claimed is:

1. An acoustic processing device comprising:
   a controller;
   a signal input/output unit that receives and outputs a signal from/to a first external equipment;
   a sound signal processing unit that performs predetermined processing on a sound signal and outputs the sound signal;
   a sound output terminal from which a sound is output to a second external equipment;
   a main power supply; and
   an auxiliary power supply, wherein
   the controller performs a standby through mode which supplies power from the auxiliary power supply to the signal input/output unit, without causing the main power supply to supply power, in order to output an input signal to the first external equipment or the second external equipment,
   the controller supplies power from the auxiliary power supply to the sound signal processing unit as well in the standby through mode, and
   the sound signal processing unit in the standby through mode extracts the sound signal from the signal which is input to the signal input/output unit, extracts a high-frequency sound component and a low-frequency sound component from the sound signal, outputs the high-frequency sound component to the signal input/output unit, and outputs the low-frequency sound component from the sound output terminal.

2. The acoustic processing device according to claim 1, wherein the sound signal processing unit includes an acoustic processing section for performing acoustic processing on the sound signal, and
   the controller supplies power from the auxiliary power supply also to the acoustic processing section in the standby through mode.

3. The acoustic processing device according to claim 1, further comprising:
   an analog-digital conversion unit that converts an input analog signal into a digital signal, wherein
   the controller supplies power from the auxiliary power supply to the analog-digital conversion unit as well in the standby through mode, and the analog-digital conversion unit outputs the converted digital signal to the sound signal processing unit or the signal input/output unit in the standby through mode.

4. The acoustic processing device according to claim 1, wherein the first external equipment includes a television or an AV player, and
the second external equipment includes a speaker having an amplification function.

5. An acoustic processing device comprising:
a controller;
a signal input/output unit that receives and outputs a signal from/to a first external equipment;
a sound signal processing unit that performs predetermined processing on a sound signal and outputs the sound signal;
a sound output terminal from which the sound signal is output to a second external equipment;
a main power supply; and
an auxiliary power supply, wherein
the controller performs a standby through mode which supplies power from the auxiliary power supply to the signal input/output unit, without causing the main power supply to supply power, in order to output an input signal to the first external equipment or the second external equipment,
the controller supplies power from the auxiliary power supply to the sound signal processing unit as well in the standby through mode,
the signal input/output unit receives the sound signal from the first external equipment in the standby through mode, and
the sound signal processing unit in the standby through mode extracts a low-frequency sound component from the sound signal which is input to the signal input/output unit and outputs the low-frequency sound component from the sound output terminal.

6. The acoustic processing device according to claim 5, wherein the signal input/output unit is a high definition multimedia interface (HDMI) output interface, and
the HDMI output interface receives the sound signal as an input using an audio return channel (ARC) based on an HDMI standard in the standby through mode.

7. The acoustic processing device according to claim 1, wherein the sound signal processing unit includes a low-pass filter with a predetermined cutoff frequency and extracts the low-frequency sound component from the sound signal with the cutoff frequency of the low-pass filter.

8. The acoustic processing device according to claim 5, wherein the sound signal processing unit includes a low-pass filter with a predetermined cutoff frequency and extracts the low-frequency sound component from the sound signal with the cutoff frequency of the low-pass filter.

* * * * *